US00RE48673E

(19) United States
(12) Reissued Patent
Silver

(10) Patent Number: US RE48,673 E
(45) Date of Reissued Patent: Aug. 10, 2021

(54) SEATING SOFA WITH LAMINATED READILY REBOUNDABLE COOLING-EFFECT SEATING CUSHIONS

(71) Applicant: MAX HOME, LLC, Fulton, MS (US)

(72) Inventor: Martin G. Silver, Palm Beach, FL (US)

(73) Assignee: MAX HOME, LLC, Fulton, MS (US)

(21) Appl. No.: 16/401,520

(22) Filed: May 2, 2019

Related U.S. Patent Documents

Reissue of:
(64) Patent No.: 9,820,579
Issued: Nov. 21, 2017
Appl. No.: 15/274,192
Filed: Sep. 23, 2016

U.S. Applications:
(60) Provisional application No. 62/222,912, filed on Sep. 24, 2015.

(51) Int. Cl.

| | |
|---|---|
| ***A47C 17/02*** | (2006.01) |
| ***A47C 7/74*** | (2006.01) |
| ***A47C 7/18*** | (2006.01) |
| ***A47C 27/15*** | (2006.01) |
| *A47F 7/18* | (2006.01) |

(52) U.S. Cl.
CPC ..... *A47C 7/746* (2013.01); *A47C 7/18* (2013.01); *A47C 17/02* (2013.01); *A47C 27/15* (2013.01)

(58) Field of Classification Search
CPC ..... A47C 7/746; A47C 7/18; A47C 27/15
USPC ..... 297/245.48, 452.58, 452.18
See application file for complete search history.

(56) References Cited

U.S. PATENT DOCUMENTS

| | | | | |
|---|---|---|---|---|
| 2,082,427 | A * | 6/1937 | Sechrest | A47C 17/02 297/452.18 |
| 4,207,636 | A * | 6/1980 | Ceriani | A47C 27/22 428/101 |
| 5,543,213 | A * | 8/1996 | Duvenkamp | B60N 2/5866 297/452.58 |
| 6,677,026 | B1 * | 1/2004 | Yates | A47C 27/085 297/452.41 |
| 8,141,957 | B2 * | 3/2012 | McClung | A47C 7/282 297/452.27 |
| 2012/0011656 | A1 * | 1/2012 | Daly | A47C 4/54 5/652.1 |
| 2012/0180225 | A1 * | 7/2012 | Gladney | A47C 27/148 5/740 |
| 2013/0291311 | A1 * | 11/2013 | Wang | A47C 21/046 5/724 |
| 2014/0359939 | A1 * | 12/2014 | Carlitz | A47C 27/085 5/421 |

(Continued)

*Primary Examiner* — Cary E Wehner
(74) *Attorney, Agent, or Firm* — Baker Donelson; Dorian B. Kennedy; Carl M. Davis, II

(57) ABSTRACT

A cushion having a foam core sandwiched by opposing gel infused viscoelastic pads adhesively attached to the core, the assembly wrapped in a non-woven and received in an upholstery casing, for seating use of the cushion in a furniture piece that during use for seating, the upper one of the pads wicking body heat into the seating cushion away from the person sitting thereon to provide a perception of cooling and the compressed pad readily reboundable to a noncompressed state after occupancy, and the cushion rotatable to selectively alternate the seating pad for use.

30 Claims, 2 Drawing Sheets

(56) References Cited

U.S. PATENT DOCUMENTS

| | | | | |
|---|---|---|---|---|
| 2015/0335168 | A1* | 11/2015 | Favata | A47C 27/15 297/452.61 |
| 2016/0066700 | A1* | 3/2016 | Lin | A47C 27/121 5/652.1 |
| 2016/0166074 | A1* | 6/2016 | Rose | A47C 21/046 5/636 |
| 2016/0235204 | A1* | 8/2016 | Andreotti | A47C 7/34 |

* cited by examiner

SEATING SOFA WITH LAMINATED READILY REBOUNDABLE COOLING-EFFECT SEATING CUSHIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to cushioned seating furniture. More particularly, the present invention relates to seating furniture having seating cushions that readily rebound in recovery from seating occupancy impressions while providing during occupancy a positive impact on perceived thermal seating comfort.

BACKGROUND OF THE INVENTION

Cushioned furniture such as sofas and chairs provide persons with seating furniture while also providing rooms with ornamentation arising from the style and materials of which the furniture is manufactured. The cushions provide a resilient and comfortable place for persons to occupy such as for reading, watching television, and talking with others such as parties or social events, among other purposes. The cushions are typically covered with ornamental fabrics and may be attached to frame members of the furniture or may be separate cushions held within upholstered casings. Such separate cushions enable removal for cleaning of the frame members of the furniture, for example, for cleaning dust and articles that may accumulate in the gaps between adjacent cushions. While cushions in furniture provide comfortable seating, occupancy by persons of upholstered cushions often have drawbacks which are typically tolerated as acceptable aspects of upholstered cushioned furniture. One drawback to cushioned furniture is involves cushions or pillows formed with feathers and/or down. The feathers break-down over time and usage, and result in reduced billowing for use as cushions for furniture. These pillows and cushions require re-fluffing, such as by manual fluffing of the enclosed feathers and down to allow the feathers and down to breathe and remain light and separated during non-use of the cushion to avoid clumping and reduce break-down during use.

Another drawback is a perception by the seating occupant of increased warmth created while sitting. The perception arises in response to body heat production local to the occupied seating. Typically, a normal core temperature for a person about is 98.6° F., while skin temperature is around 92° F. Because the ambient temperature is often lower than that, a person emits body heat to the surroundings. The cushions on which a person sits thereby become warmer, and as the area of occupancy becomes warmer, the person sitting on the cushion perceives an increase is ambient sitting temperature. For example, a person watching television may leave a seat which is then occupied by second person. The second person would likely detect the increased temperature of the recently-vacated seating area (adjusted for ambient room temperature and time since vacating the occupancy as the seating area returns to ambient temperature).

Further, the vacating person may also leave a depression or valley in the resilient cushion. The depression or valley forms in response to the compression loading of the person to the cushion. Typically, cushions rebound after vacating of the loading to a recovered relaxed, non-compressed state, although the time for such rebound varies depending on a number of factors including ambient temperature, occupancy time, occupant mass, and resilience performance characteristics of the cushions. While cushions typically rebound to a normal relaxed state, the appearance of such valleys is detracting and notwithstanding the responsive rebound, may over time and use, lose the rebounding performance and create rather a permanent valley which detracts from the ornamental appearance and useful life of the cushioned furniture.

Accordingly, there is a need in the art for seating furniture having upholstered seating cushions that readily rebounds from seating occupancy impressions while providing during occupancy a positive impact on perceived thermal comfort by reducing increases in local ambient temperature arising from body heat production. It is to such that the present invention is directed.

SUMMARY OF THE INVENTION

The present invention meets the need in the art by providing a cushion for seating furniture pieces, comprising a pair of gel infused viscoelastic pads, each gel infused viscoelastic pad having a length, a width, and a thickness and defining a sitting side and an opposing adherence side. The gel infused viscoelastic pads sandwich a core foam pad having a core length, a core width, and a core thickness and defining opposing first and second core adherence sides. Each of the pair of gel infused viscoelastic pads laminate on the adherence side to a respective one of the opposing first and second core adherence sides to define an adherence boundary therebetween, whereby the core foam pad is disposed between the pair of gel infused viscoelastic pads. A covering sheet overlies the adherence boundary on a side face of the laminated core foam pad and gel infused viscoelastic pads. An upholstered casing receives and encloses the laminated core foam pad and gel infused viscoelastic pads as a seating cushion. The laminated gel infused viscoelastic pads have a first state and a second state, the second state defining a recessed valley in the sitting side of an uppermost one of the pair of gel infused viscoelastic pads by compressive loading of a person sitting thereon during use of the seating cushion by an occupant for sitting on a piece of furniture while the first state is relaxed therefrom to a substantially planar surface. The uppermost one of the gel infused viscoelastic pads of the seating cushion being occupied by the person for sitting on the piece of furniture, wicks body heat from the person inwardly of the seating cushion to reduce perceived changes in a seating temperature and defines the valley while readily rebounding to the first state relaxed from the second state upon egress from sitting by the occupant person.

In another aspect, the present invention provides a furniture piece with at least one seating cushion comprising a frame having a front and rear rail joined at opposing ends to opposing arm structures, each arm structure having front and back arm posts and an arm top, and a pair of legs extending downwardly to support the frame on a floor surface. A great rail extends between the opposing back posts and a seating foundation attaches to the frame. The seating foundation receives at least one seating cushion for occupancy by a person using the furniture piece for furniture piece purposes. The seating cushion comprises a pair of gel infused viscoelastic pads, each pad having a length, a width, and a thickness and defining a sitting side and an opposing adherence side, and a core foam pad having a core length, a core width, and a core thickness and defining opposing first and second core adherence sides. Each of the pair of gel infused viscoelastic pads laminate on the adherence side to a respective one of the opposing first and second core adherence sides to define an adherence boundary therebetween, whereby the core foam pad is sandwiched between the pair of gel infused viscoelastic pads. A covering sheet overlies the adherence boundary on a side face of the laminated core foam pad and gel infused viscoelastic pads. An upholstered casing receives and encloses the covered laminated core and pads. The laminated gel infused viscoelastic pads have a first state and a second state, the second state having a recessed valley defined in the sitting side of an uppermost a one of the pair of gel infused pads by compressive loading of a person sitting thereon during use of the seating cushion on the furniture piece. The one of the gel infused viscoelastic pads of the seating cushion being occupied by the person on the piece of furniture, wicks body heat from the person inwardly of the seating cushion to reduce perceived changes in a seating temperature and defines the valley while readily rebounding to the first state upon egress from sitting by the person.

Advantages, features, and objects of the present invention will become readily apparent upon a reading of the following detailed description of the invention with reference to the drawings and in conjunction with the appended claims.

DETAILED DESCRIPTION

Figure 1:
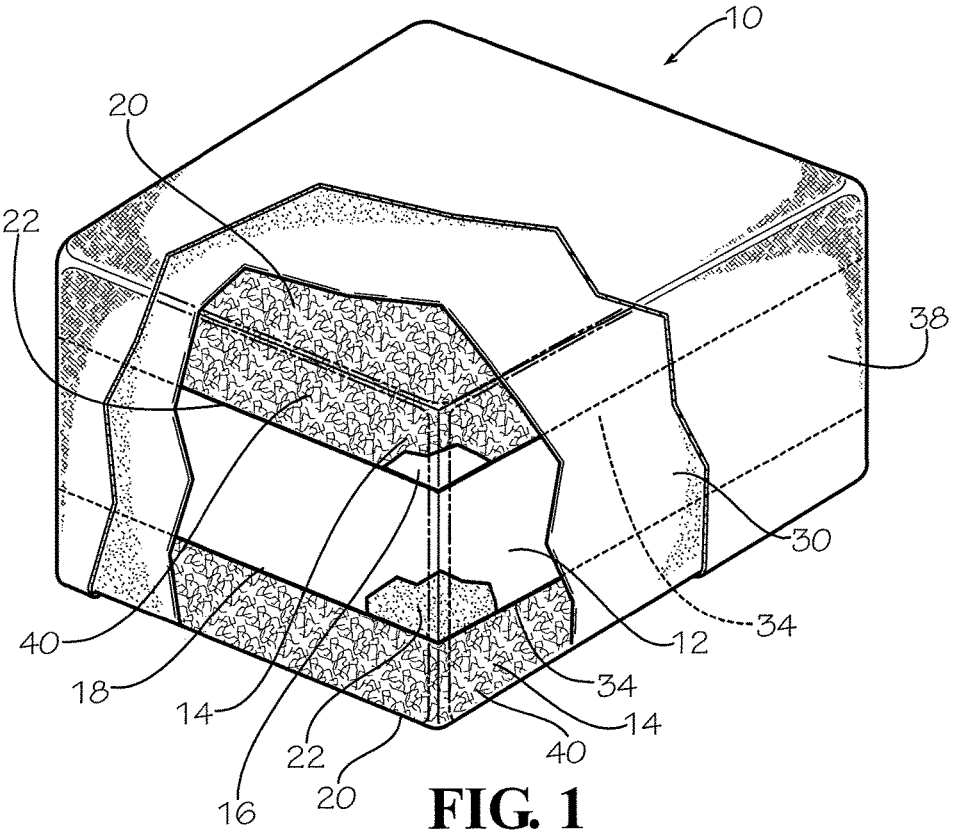
FIG. 1 illustrates in perspective cut-away view an upholstered seating cushion in accordance with the present invention.

With reference to the drawings in which like parts have like identifiers, FIG. 1 illustrates in perspective cut-away view a laminated cushion 10 in accordance with the present invention. The cushion 10 comprises a core 12 of a foam material sandwiched on opposing sides by a pair of gel infused viscoelastic pads 14. The core 12 has a length, width and thickness and defines first and second core adherence sides 16, 18. Each pad 14 also has a length, a width, and a thickness and defines a sitting side 20 and an opposing adherence side 22. Each pad 14 laminates on its adherence side 22 to a respective one of the opposing first and second core adherence sides 16, 18. This defines an adherence boundary 34 between the core 12 and the pad 14, whereby the core is sandwiched between the pair of gel infused viscoelastic pads 14. A covering sheet 30 overlies at least the adherence boundary 34 on respective side faces of the cushion 10. In an alternate embodiment, the covering sheet 30 envelopes and covers the laminated pads and core. An upholstered casing 38 receives, and encloses, the covered laminated core 12 and pads 14. The casing 38 may be made of synthetic materials, leather, or woven fabrics. The casing 38 may include an opening selectively closable by a closing device such as a zipper, but may also be seamed closed and thereby restricting readily removing the covered laminated core 12 and pads 14.

In the illustrated embodiment, the covering sheet 30 is a nonwoven fabric. Prior to wrapping, the outside surfaces of the laminated core 12 and pads 14 are lightly sprayed with an adhesive. The covering 30 wraps around the laminated core 12 and pads 14 and secures thereto with the adhesive.

The pads 14 are a dense foam material that is infused with a thermogel material 40. *The pad foam material has a density of about 1.8 pounds per cubic foot.* The thermogel material readily wicks heat that otherwise would not communicate into or through the foam material that has an insulative effect. G FLEX gel infused pads are available from Flexible Foam Products, Inc., of Spencerville, Ohio 45887. The core 12 is a high density foam, a synthetic material, a rubber latex, polyurethane, or other resilient cushioning foam. The core 12 is preferably a high density polyurethane form. The core may have density in the range of about 1.5-2.5 pounds per cubic foot. HIGH COMFORT high resiliency polyurethane foam used in the illustrated embodiment is available from Flexible Foam Products, Inc., of Spencerville, Ohio 45887. In the illustrated embodiment, the core 12 has core length of 20 inches, a core width of 20 inches, and a core thickness of 5 inches. The pads 12 have respective pad length and width of 20 inches and a pad thickness of 2½ inches. It is to be appreciated that the length, width, and thickness may be changed to accommodate a particular furniture piece.

Figure 2:
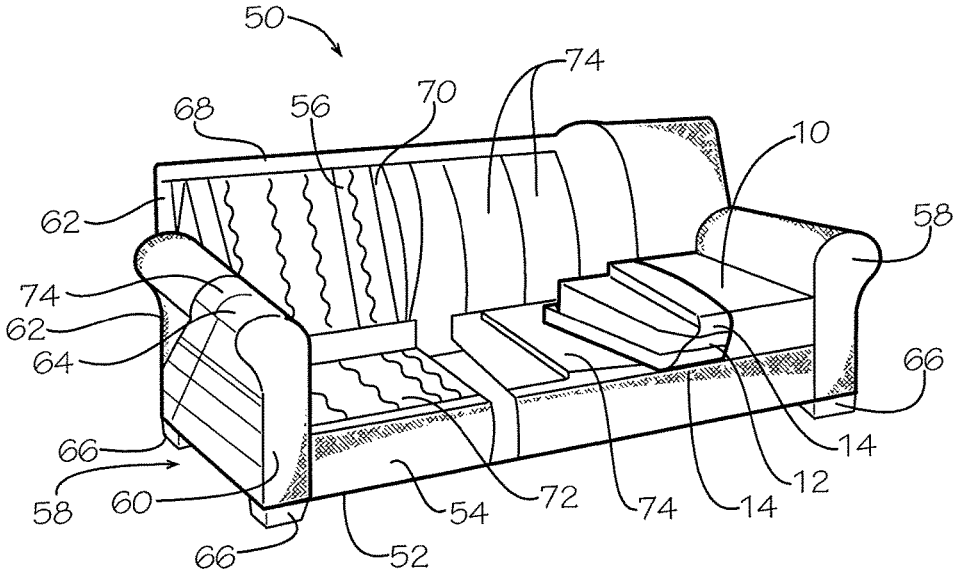
FIG. 2 illustrates in perspective cut-away view a furniture piece using the upholstered seating cushion illustrated in FIG. 1.

FIG. 2 illustrates a furniture piece 50 that uses the upholstered cushion 10. The illustrated furniture piece 50 is configured as a sofa, but seating furniture are similarly constructed. The furniture piece 50 includes a frame 52 with opposing front and back longitudinal rails 54, 56 joined at opposing ends by arm structures 58 having front and back arm posts 60, 62 and an arm top 64. Legs 66 extend downwardly to support the frame 52 from a floor surface. A great rail 68 extends longitudinally between the opposing back posts 62 with spaced back uprights 70 extending between the back rail 56 and the great rail 64. The opposing front and back rails support a seating foundation 72, such as conventional jute webbing and spring members. Similarly, the back supports a jute and spring foundation between the back rail and the great rail. Padding and liners generally 74 conventional in the trade, such as cotton batting and burlap sheeting, attach to the foundations and the arm structures. The back cushions are made and covered with the selected ornamental fabric, and may be joined together side-by-side before attaching to the back. The seat cushions 10 are prepared with the selected fabric for the ornamental casing. The illustrated embodiment is sized for three seat cushions 10.

Figure 4:
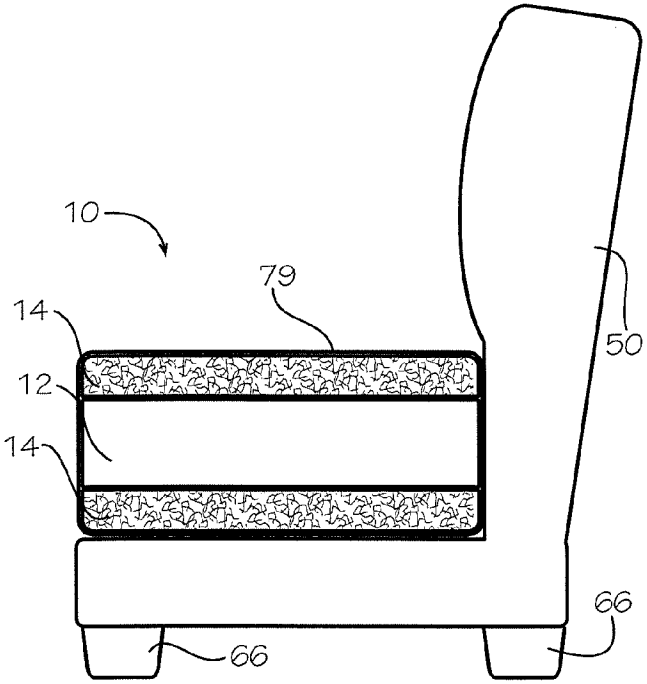
FIG. 4 illustrates in side schematic view the cushion in a first state prior to use for seating in the furniture piece illustrated in FIG. 2.
Figure 3:
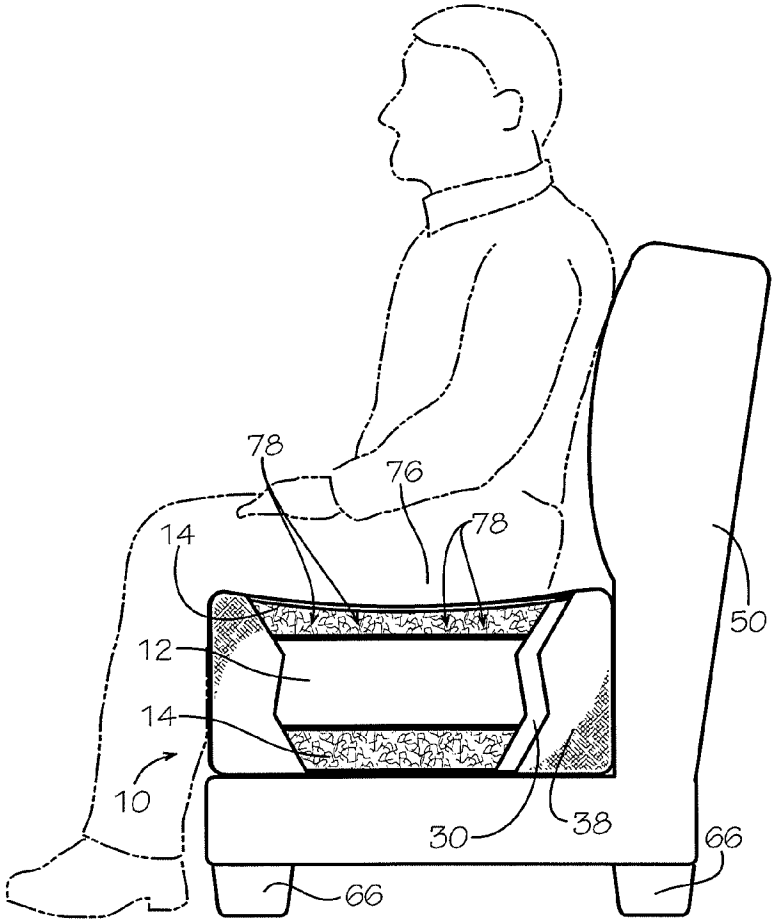
FIG. 3 illustrates in side schematic view a person sitting on the cushion while using the furniture piece illustrated in FIG. 2.

FIG. 3 illustrates in side schematic view a person occupying the seating provided by the cushion 10 supported on the foundation of the furniture piece 50. The laminated pads 14 have a first state and a second state. In the first state, the surface of the upholstered cushion is substantially planar (as shown in FIG. 4) without seating recesses caused by an occupant/sitter loading the cushion. In the second state as shown in FIG. 3, the cushion 10 has one or more recessed valleys 76 defined in the upper seating one of the pair of gel infused pads 14. The valley 76 forms in response to the compressive loading of a person sitting on the cushion 10 during use of the furniture piece 50 for seating.

By sitting on the seating cushion 10, the person loads the seating cushion and the seating cushion 10 compresses to define the recess 76 in the seating surface. The gel infusion 40 in the upper pad 14 on which the person sits wicks body heat from the occupant through the upholstery 38 and into and through the gel infused pad, as indicated by the arrows 78. The thermo-communicative gel therein effects a reduction in sitting temperature perceived by the occupant, and thereby produces a thermophysical sense of cooled seating as the seating surface of the cushion 10 tends to remain at about ambient temperature rather than increasing locally in response to body heat of the sitting occupant.

FIG. 4 illustrates in side schematic view the cushion 10 after departure of the occupant, in which the gel infused pad 14 rebounds from the second state to the first state relaxed to a substantially planar surface 79, for readily returning the furniture piece 50 to a perceived unused status. The gel infused viscoelastic pad 14, being occupied by a person on a piece of furniture, wicks body heat from the person inwardly of the seating cushion to reduce perceived changes in seating temperature and defines the valley while readily rebounding to the relaxed first state upon egress from sitting by the occupant person.

The gel infused pads 14 laminated on opposing sides of the cushion core 14 make the cushion 10 reversible so that a consumer may readily flip the cushion. The seating cushion 10 accordingly readily rotates to dispose the second one of the pads 14 uppermost for seating and thereby distribute the wear from compressive loading on the pads 14 and core 12, as well as even the wear on the outer fabric 38.

The present invention accordingly provides the seating cushion usable in a furniture piece for cushioned seating of the occupant while effecting a perception of cooling seating as body heat wicks into the laminated seating cushion and readily rebounds from a compressed state to a relaxed planar state for ornamental effect for further seating use. The principles, preferred embodiments, and modes of operation of the present invention have been described in the foregoing specification with regard to an illustrative, non-limiting embodiment. The invention accordingly is not to be construed as limited to the particular forms disclosed as these are regarded as illustrative rather than restrictive. Moreover, variations and changes may be made by those skilled in the art without departing from the spirit of the invention described in the following claims.

What is claimed is:

1. A laminated seating cushion for a piece of furniture, comprising:

a pair of gel infused viscoelastic pads, each pad having a length, a width, and a thickness and defining a sitting side and an opposing adherence side;

a core foam pad having a core length, a core width, and a core thickness and defining opposing first and second core adherence sides, each of the pair of gel infused viscoelastic pads laminated on the adherence side to a respective one of the opposing first and second core adherence sides to define an adherence boundary therebetween, whereby the core foam pad is disposed between the pair of gel infused viscoelastic pads;

a *non-thermally insulative* covering sheet *in direct contact with and* overlying the adherence boundary on a side face of the laminated core foam pad and gel infused viscoelastic pads; and

[an] *a non-thermally insulative* upholstered casing that receives and encloses the laminated viscoelastic pads and the core foam pad as a seating cushion;

the laminated gel infused viscoelastic pads having a first state and a second state, the second state defining a recessed valley in a sitting side of an uppermost one of the pair of gel infused viscoelastic pads by compressive loading of a person sitting thereon during use of the seating cushion on the piece of furniture for seating purposes and the first state relaxed therefrom to a substantially planar surface;

whereby the uppermost one of the gel infused viscoelastic pads of the seating cushion being occupied by the person for sitting on the piece of furniture, wicks body heat from the person inwardly to reduce perceived changes in a seating temperature and defines the valley while readily rebounding to the first state relaxed from the second state upon egress from sitting by the occupant person.

2. The laminated seating cushion as recited in claim 1, wherein the density of the gel infused viscoelastic pads is about 1.8 pounds per cubic foot.

3. The laminated seating cushion as recited in claim 1, wherein the density of the core is about 1.8 pounds per cubic foot.

4. The laminated seating cushion as recited in claim 1, wherein the gel infused viscoelastic pads comprises a thermally communicative gel dispersed within a viscoelastic foam material.

5. The laminated seating cushion as recited in claim 4, wherein the thermally communicative gel is infused substantially uniformly within the viscoelastic foam material.

6. The laminated seating cushion as recited in claim 1, wherein the sheet comprises a non-woven fabric.

7. The laminated seating cushion as recited in claim 1, wherein the casing comprises a woven fabric.

8. A furniture piece with a laminated seating cushion as recited in claim 1.

9. A furniture piece with at least one laminated seating cushion, comprising:

a frame for a furniture piece having a front and a rear rail joined at opposing ends to opposing arm structures, each arm structure having front and back arm posts and an arm top, and a pair of legs extending downwardly to support the frame on a floor surface, a great rail extending between the opposing back arm posts, and a seating foundation attached to the frame;

at least one seating cushion received on the seating foundation for occupancy by a person using the furniture piece purposes, the seating cushion comprising:

a pair of gel infused viscoelastic pads, each pad having a length, a width, and a thickness and defining a sitting side and an opposing adherence side;

a core foam pad having a core length, a core width, and a core thickness and defining opposing first and second core adherence sides, each of the pair of gel infused viscoelastic pads laminated on the adherence side to a respective one of the opposing first and second core adherence sides to define an adherence boundary therebetween, whereby the core foam pad is sandwiched between the pair of gel infused viscoelastic pads;

a *non-thermally insulative* covering sheet *in direct contact with and* overlying the adherence boundary on a side face of the laminated core foam pad and the gel infused viscoelastic pads; and

[an] *a non-thermally insulative* upholstered casing that receives and encloses the laminated core foam pad and the gel infused viscoelastic pads, the laminated gel infused viscoelastic pads having a first state and a second state, the second state having a recessed valley defined in a sitting side of an uppermost one of the pair of gel infused viscoelastic pads by compressive loading of a person sitting thereon during use of the seating cushion on the furniture piece for seating, whereby the one of the gel infused viscoelastic pads of the seating cushion being occupied by a person on the piece of furniture, wicks body heat from the person inwardly of the seating cushion to reduce perceived changes in a seating temperature and defines the valley while readily rebounding to the first state upon egress from sitting on the furniture piece by the person.

10. The furniture piece as recited in claim 9, wherein the density of the gel infused viscoelastic pads is about 1.8 pounds per cubic foot.

11. The furniture piece as recited in claim 9, wherein the density of the core is about 1.8 pounds per cubic foot.

12. The furniture piece as recited in claim 9, wherein the gel infused viscoelastic pads comprises a thermally communicative gel dispersed within a viscoelastic foam material.

13. The furniture piece as recited in claim 12, wherein the thermally communicative gel is infused substantially uniformly within the viscoelastic foam material.

14. The furniture piece as recited in claim 9, wherein the sheet comprises a non-woven fabric.

15. The furniture piece as recited in claim 9, wherein the casing comprises a woven fabric.

*16. A laminated seating cushion for a piece of furniture, comprising:*

*a pair of gel infused viscoelastic pads, each pad having a length, a width, and a thickness and defining a sitting side and an opposing adherence side;*

*a core foam pad having a core length, a core width, and a core thickness and defining opposing first and second core adherence sides,*

*each of the pair of gel infused viscoelastic pads laminated on the adherence side to a respective one of the opposing first and second core adherence sides to define an adherence boundary therebetween, whereby the core foam pad is disposed between the pair of gel infused viscoelastic pads; and*

*a non-thermally insulative upholstered casing that receives and encloses the laminated viscoelastic pads and the core foam pad as a seating cushion, at least a portion of said casing being in direct contact with said core foam pad,*

*the laminated gel infused viscoelastic pads having a first state and a second state, the second state defining a recessed valley in a sitting side of an uppermost one of the pair of gel infused viscoelastic pads by compressive loading of a person sitting thereon during use of the seating cushion on the piece of furniture for seating purposes and the first state relaxed therefrom to a substantially planar surface;*

*whereby the uppermost one of the gel infused viscoelastic pads of the seating cushion being occupied by the person for sitting on the piece of furniture, wicks body heat from the person inwardly to reduce perceived changes in a seating temperature and defines the valley while readily rebounding to the first state relaxed from the second state upon egress from sitting by the occupant person.*

*17. The laminated seating cushion as recited in claim 16, wherein the density of the gel infused viscoelastic pads is about 1.8 pounds per cubic foot.*

*18. The laminated seating cushion as recited in claim 16, wherein the density of the core is about 1.8 pounds per cubic foot.*

*19. The laminated seating cushion as recited in claim 16, wherein the gel infused viscoelastic pads comprises a thermally communicative gel dispersed within a viscoelastic foam material.*

*20. The laminated seating cushion as recited in claim 19, wherein the thermally communicative gel is infused substantially uniformly within the viscoelastic foam material.*

*21. The laminated seating cushion as recited in claim 16, further comprising a non-thermally insulative covering sheet of a non-woven fabric.*

*22. The laminated seating cushion as recited in claim 16, wherein the casing comprises a woven fabric.*

*23. A furniture piece with a laminated seating cushion as recited in claim 16.*

*24. A furniture piece with at least one laminated seating cushion, comprising:*

*a frame for a furniture piece having a front and rear rail joined at opposing ends to opposing arm structures, each arm structure having front and back arm posts and an arm top, and a pair of legs extending downwardly to support the frame on a floor surface, a great rail extending between the opposing back arm posts, and a seating foundation attached to the frame;*

*at least one seating cushion received on the seating foundation for occupancy by a person using the furniture piece for furniture piece purposes, the seating cushion comprising:*

*a pair of gel infused viscoelastic pads, each pad having a length, a width, and a thickness and defining a sitting side and an opposing adherence side;*

*a core foam pad having a core length, a core width, and a core thickness and defining opposing first and second core adherence sides,*

*each of the pair of gel infused viscoelastic pads laminated on the adherence side to a respective one of the opposing first and second core adherence sides to define an adherence boundary therebetween, whereby the core foam pad is sandwiched between the pair of gel infused viscoelastic pads;*

*an upholstered non-thermally insulative casing that receives and encloses the laminated core foam pad and the gel infused viscoelastic pads, at least a portion of said casing being in direct contact with said core foam pad,*

*the laminated gel infused viscoelastic pads having a first state and a second state, the second state having a recessed valley defined in a sitting side of an uppermost one of the pair of gel infused viscoelastic pads by compressive loading of a person sitting thereon during use of the seating cushion on the furniture piece for seating,*

*whereby the one of the gel infused viscoelastic pads of the seating cushion being occupied by a person on the piece of furniture, wicks body heat from the person inwardly of the seating cushion to reduce perceived changes in a seating temperature and defines the valley while readily rebounding to the first state upon egress from sitting on the furniture piece by the person.*

*25. The laminated seating cushion as recited in claim 1, wherein the density of the gel infused viscoelastic pads is about 1.8 pounds per cubic foot.*

*26. The furniture piece as recited in claim 24, wherein the density of the core is about 1.8 pounds per cubic foot.*

*27. The furniture piece as recited in claim 24, wherein the gel infused viscoelastic pads comprises a thermally communicative gel dispersed within a viscoelastic foam material.*

*28. The furniture piece as recited in claim 27, wherein the thermally communicative gel is infused substantially uniformly within the viscoelastic foam material.*

*29. The furniture piece as recited in claim 24, further comprising a non-thermally insulative covering sheet of a non-woven fabric.*

*30. The furniture piece as recited in claim 24, wherein the casing comprises a woven fabric.*

* * * * *